(12) United States Patent
Horn

(10) Patent No.: US 9,934,698 B2
(45) Date of Patent: Apr. 3, 2018

(54) DEVICE FOR MANAGING MEDICINE CONSUMPTION AND/OR DISPENSING

(71) Applicant: Kimberlee Ann Horn, Crawfordsville, IN (US)

(72) Inventor: Kimberlee Ann Horn, Crawfordsville, IN (US)

( * ) Notice: Subject to any disclaimer, the term of this patent is extended or adjusted under 35 U.S.C. 154(b) by 30 days.

(21) Appl. No.: 14/706,273

(22) Filed: May 7, 2015

(65) Prior Publication Data
US 2015/0325152 A1 Nov. 12, 2015

Related U.S. Application Data

(60) Provisional application No. 61/989,592, filed on May 7, 2014.

(51) Int. Cl.
| G09B 25/02 | (2006.01) |
| G09B 19/00 | (2006.01) |
| B42D 5/00 | (2006.01) |
| A47B 23/00 | (2006.01) |

(52) U.S. Cl.
CPC ............ *G09B 19/00* (2013.01); *G09B 25/02* (2013.01); *A47B 23/002* (2013.01); *B42D 5/006* (2013.01)

(58) Field of Classification Search
CPC .............................. A47B 23/002; B42D 5/006
See application file for complete search history.

(56) References Cited

U.S. PATENT DOCUMENTS

| 630,822 | A | | 8/1899 | Bates | |
| 753,457 | A | * | 3/1904 | Weissbrod | A47B 23/002 16/DIG. 12 |
| 844,054 | A | | 2/1907 | Swope | |
| 1,397,079 | A | | 11/1921 | Cohen | |
| 1,407,239 | A | | 2/1922 | Weiss | |
| D76,777 | S | * | 11/1928 | Clark | D10/32 |
| 1,701,888 | A | * | 2/1929 | Hofferberth | A44C 5/0046 224/219 |
| 2,099,295 | A | * | 11/1937 | Canfield | B42D 5/002 108/43 |
| 4,903,932 | A | * | 2/1990 | Stewart, Jr. | A45F 5/00 224/267 |
| 4,906,025 | A | * | 3/1990 | Schreindl | A44C 5/0046 224/219 |
| D332,970 | S | * | 2/1993 | Myers | 401/6 |
| 5,271,353 | A | * | 12/1993 | Besthorne | A61J 7/04 116/308 |
| 5,311,689 | A | | 5/1994 | Lindsey | |
| 5,531,481 | A | * | 7/1996 | Wiltshire | B42D 5/005 224/219 |
| 6,530,509 | B1 | * | 3/2003 | Davis | A45C 11/34 224/219 |
| 6,752,431 | B1 | | 6/2004 | Matthews et al. | |
| D589,566 | S | * | 3/2009 | Lee | D20/19 |

(Continued)

*Primary Examiner* — Anthony Stashick
*Assistant Examiner* — James Way
(74) *Attorney, Agent, or Firm* — James Ray and Associates; Alexander Pokot

(57) ABSTRACT

An article of manufacture includes a body, a write on-surface provided on the body, a cover movable to selectively cover and uncover the write-on surface, a strap attached to the body, and a writing implement holder disposed on a surface of one of the strap, the body and the cover, the writing implement holder operable to releaseably secure a writing implement.

13 Claims, 19 Drawing Sheets

(56) References Cited

U.S. PATENT DOCUMENTS

| | | | | |
|---|---|---|---|---|
| 7,942,674 B2* | 5/2011 | Murphy | ............... | G09B 1/28 |
| | | | | 434/156 |
| 7,971,710 B1* | 7/2011 | Zaher | ............. | A63B 71/0672 |
| | | | | 206/216 |
| 2012/0085801 A1* | 4/2012 | Padilla | ............... | B42D 5/006 |
| | | | | 224/576 |
| 2014/0295130 A1 | 10/2014 | Hirth | | |

* cited by examiner

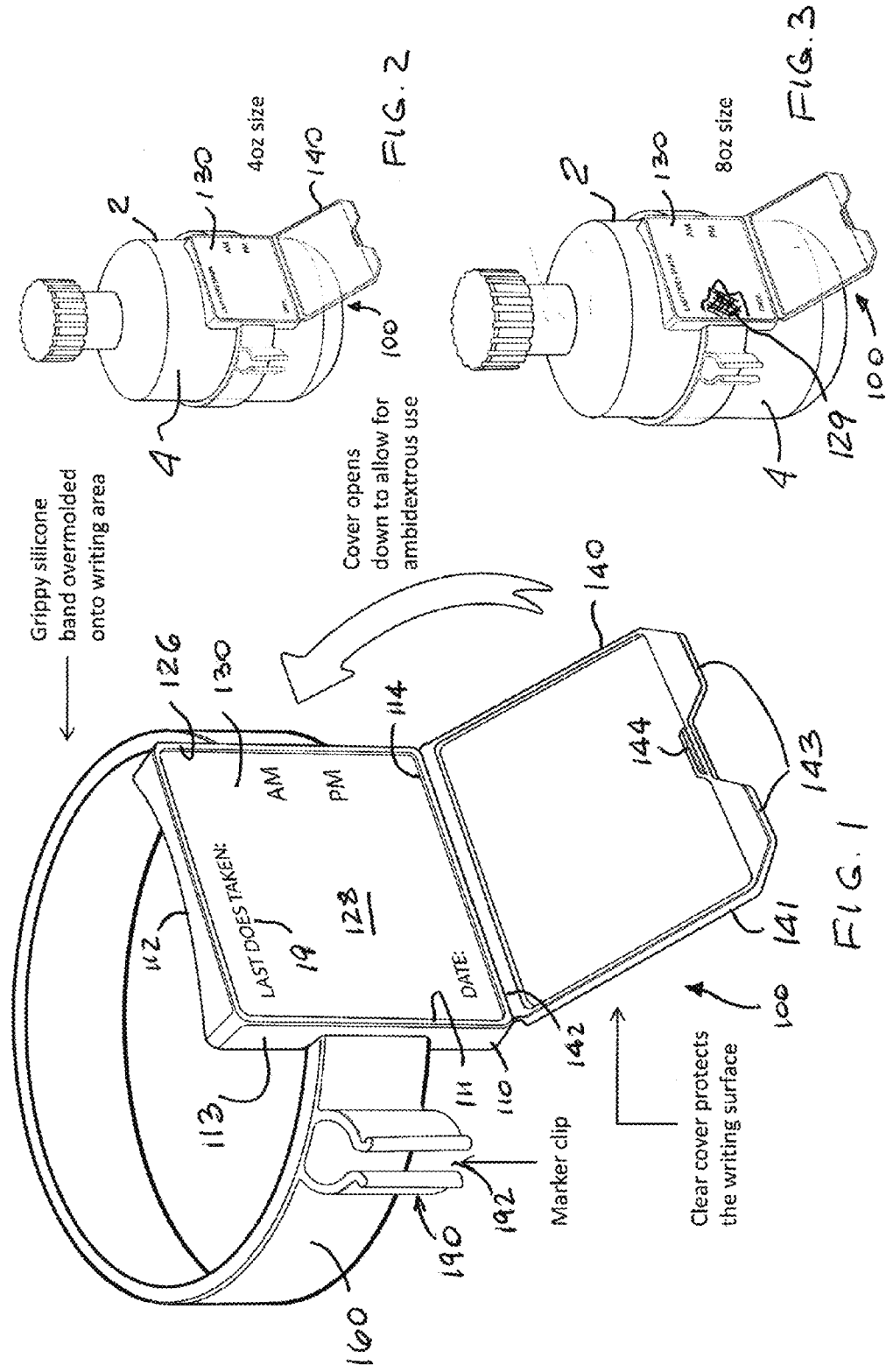

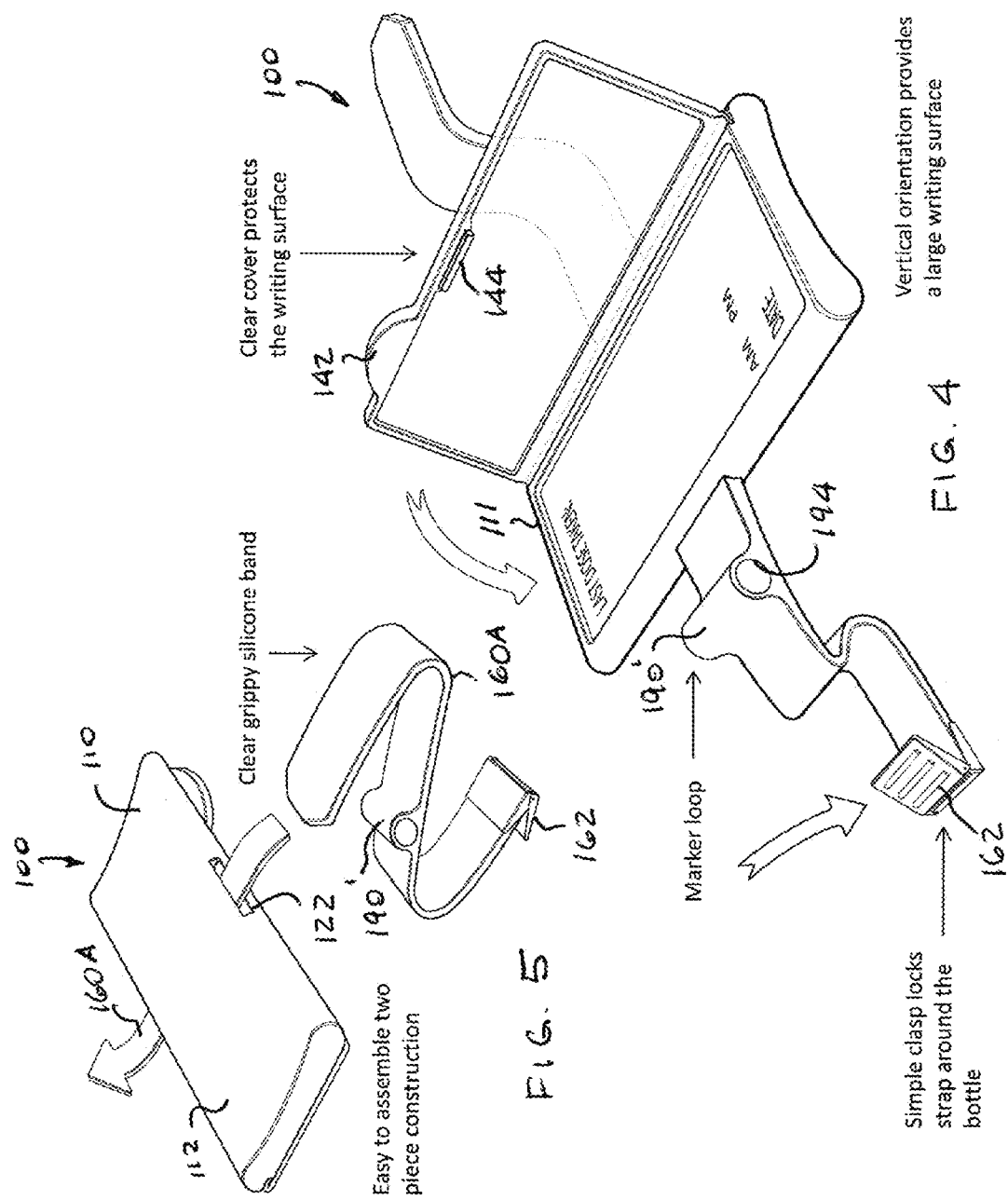

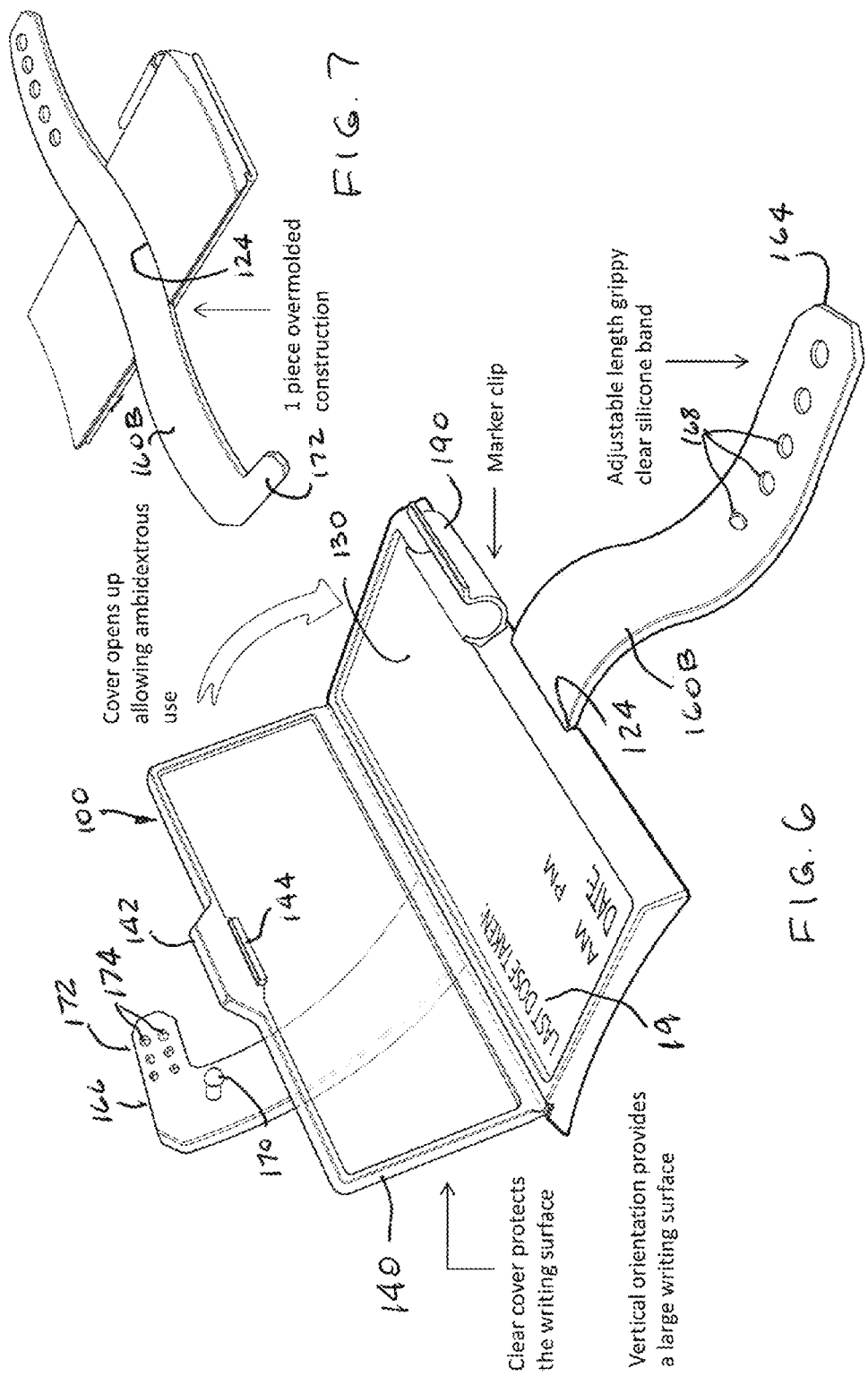

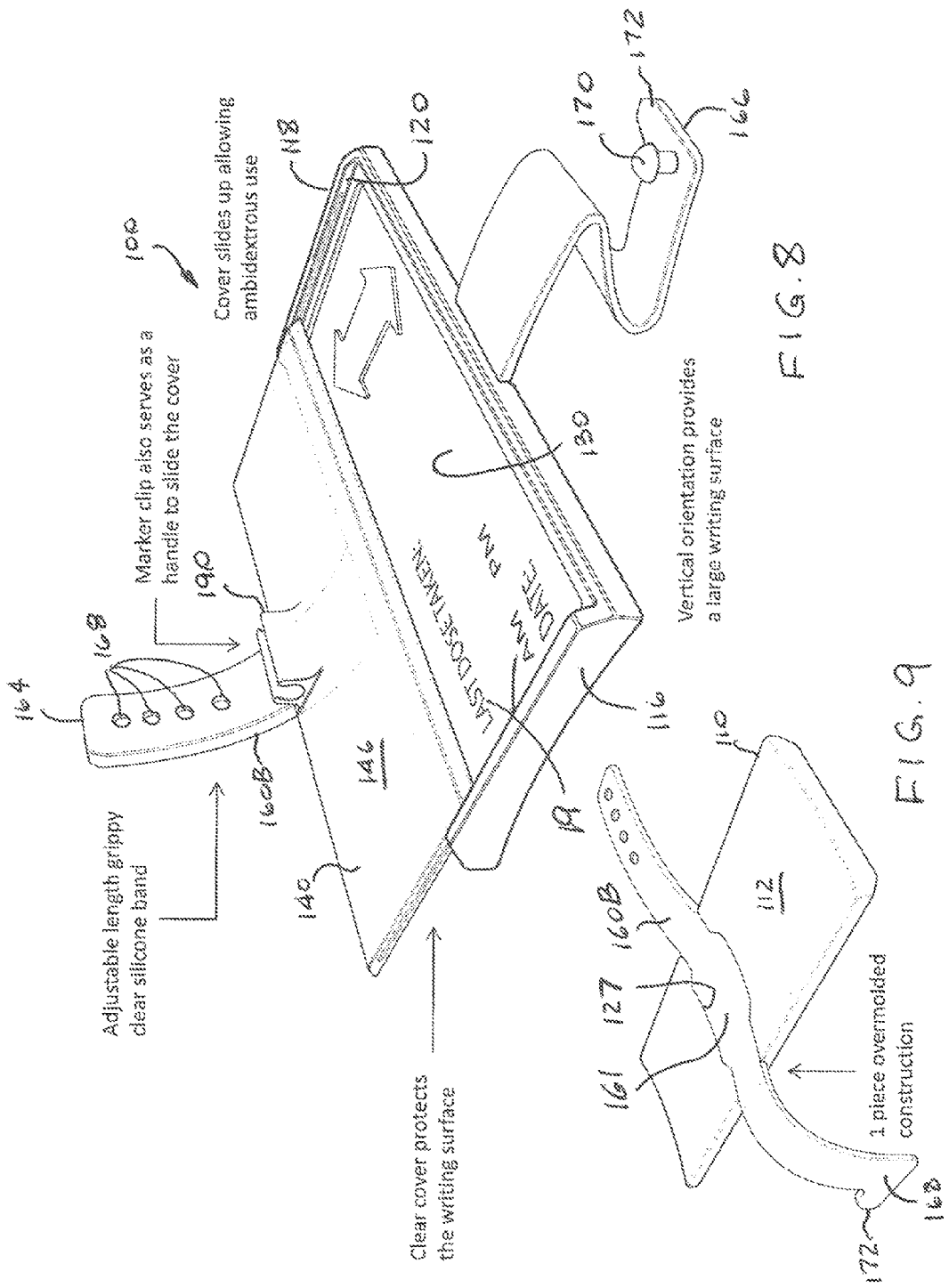

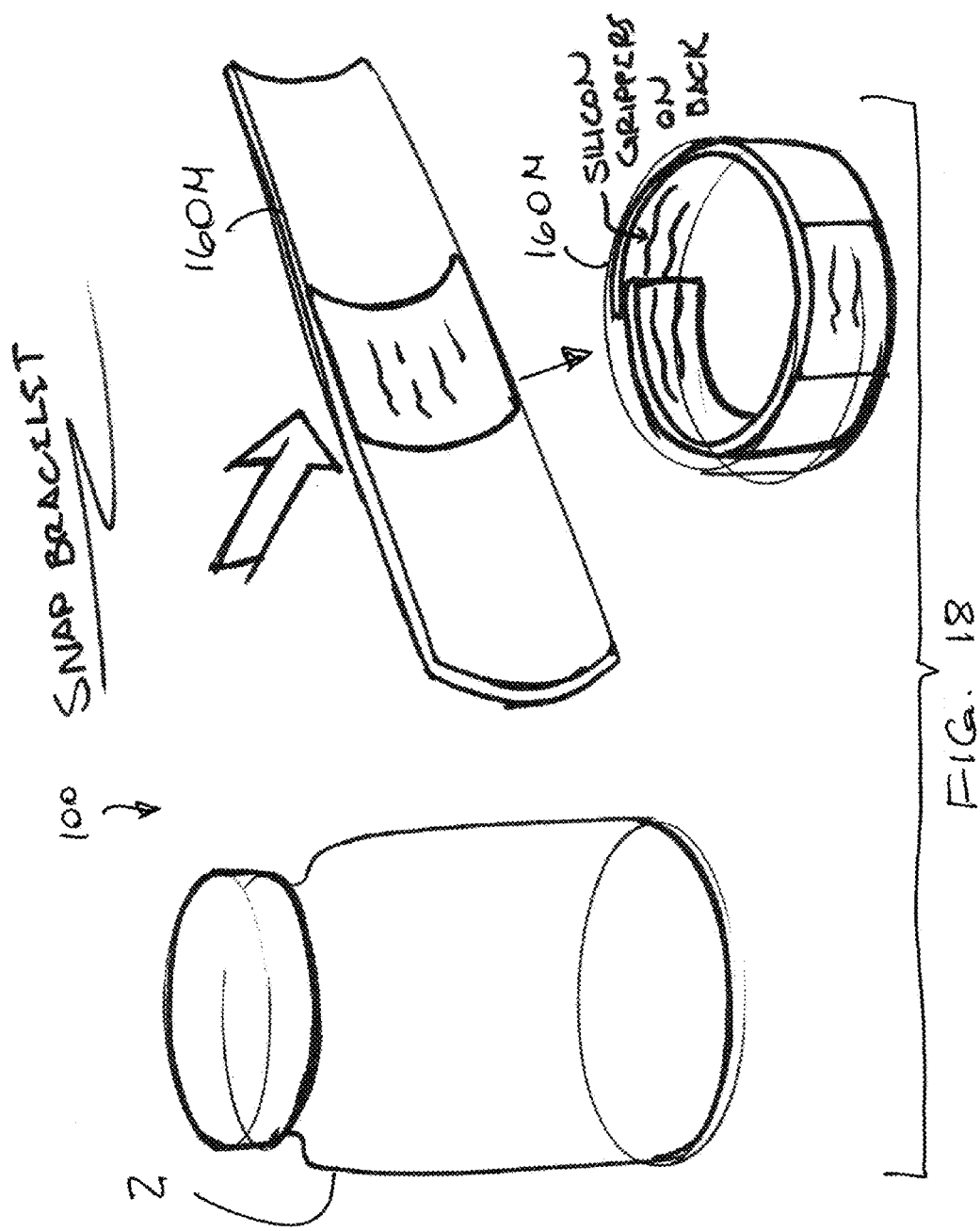

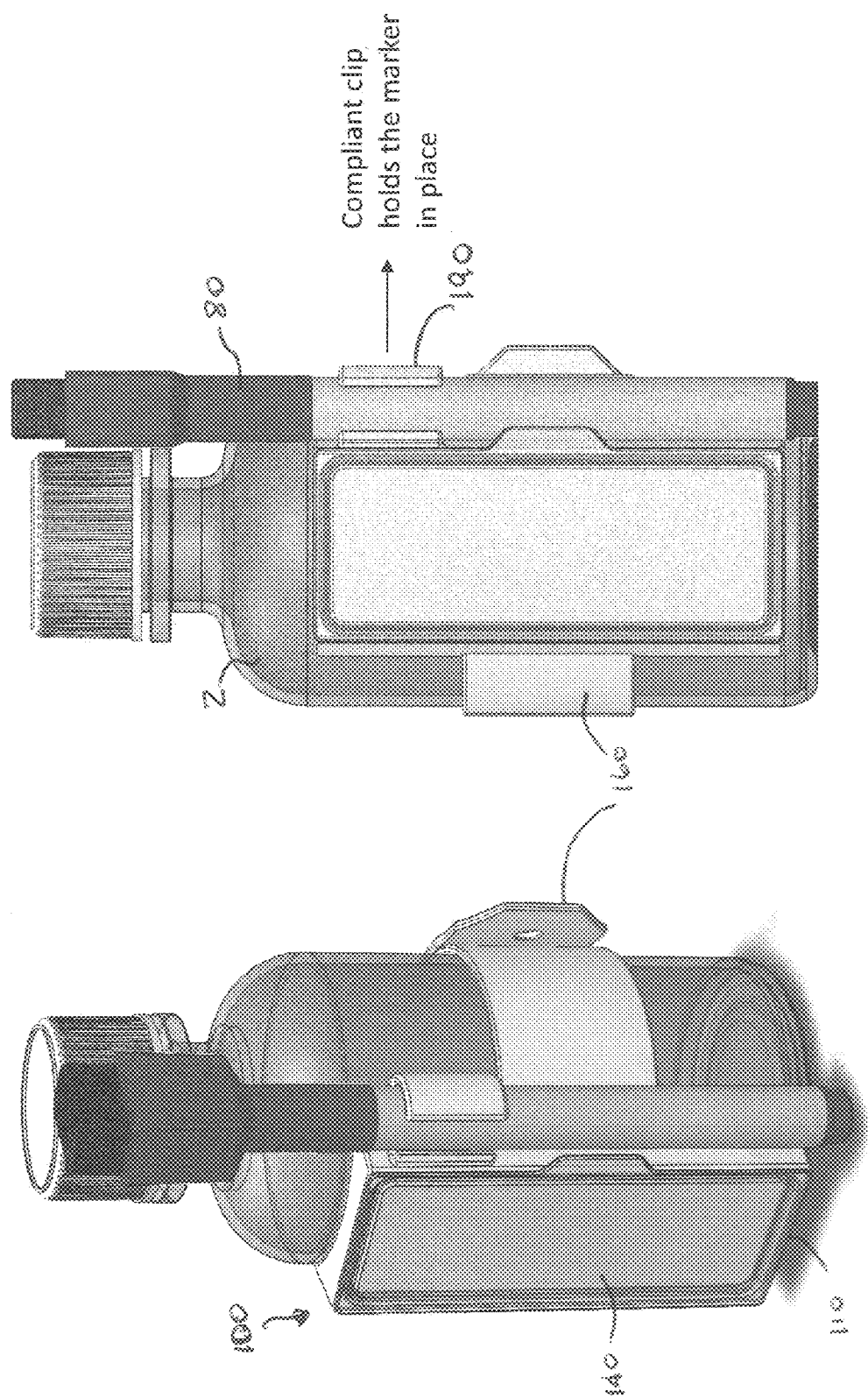

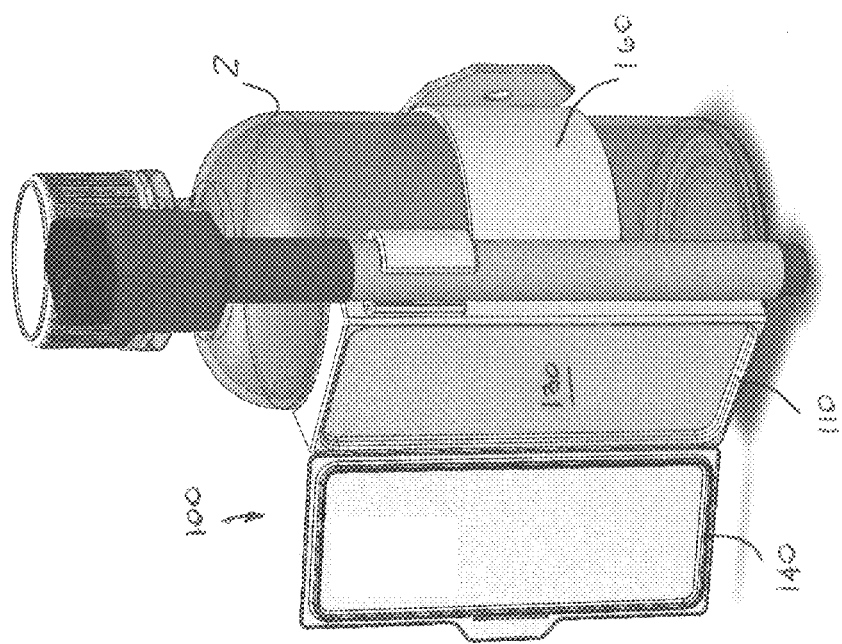

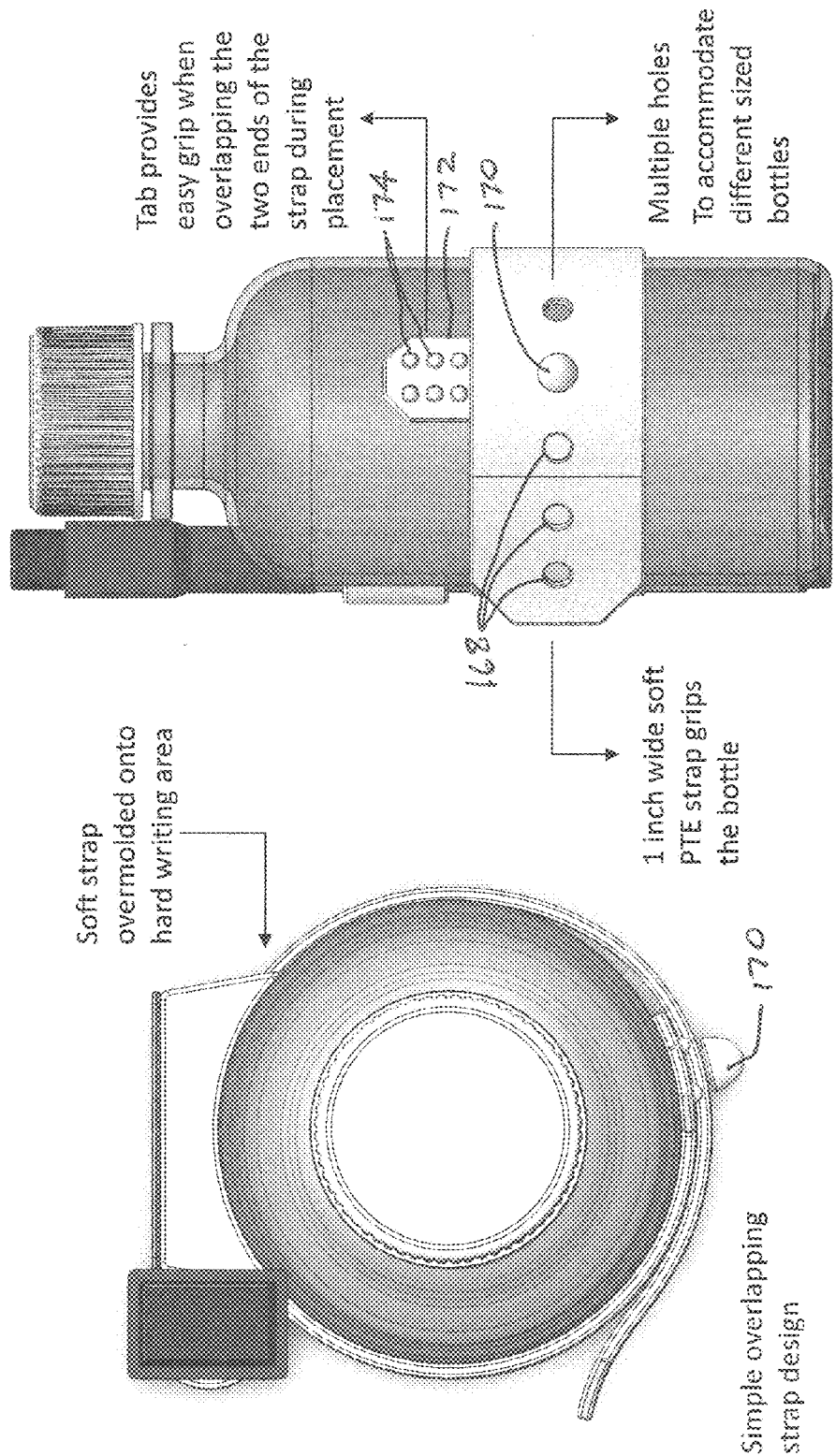

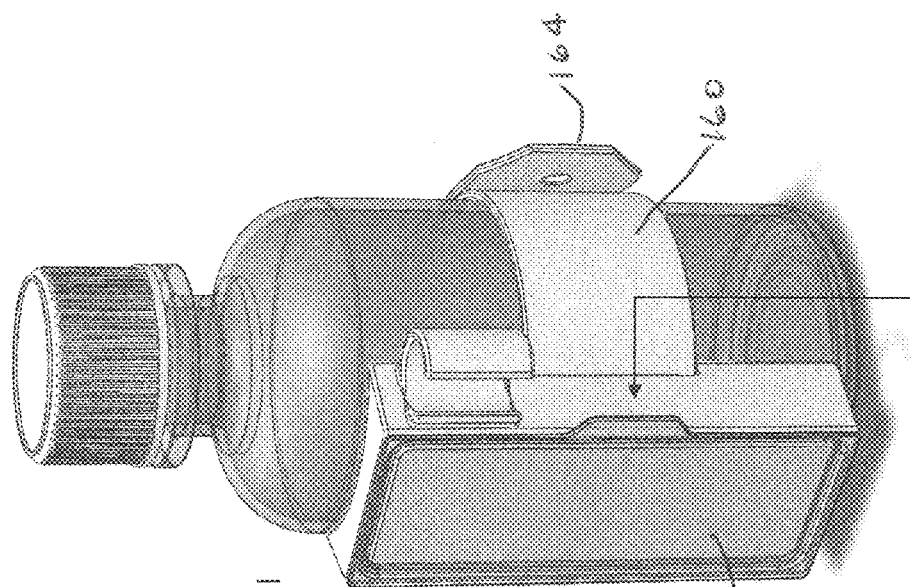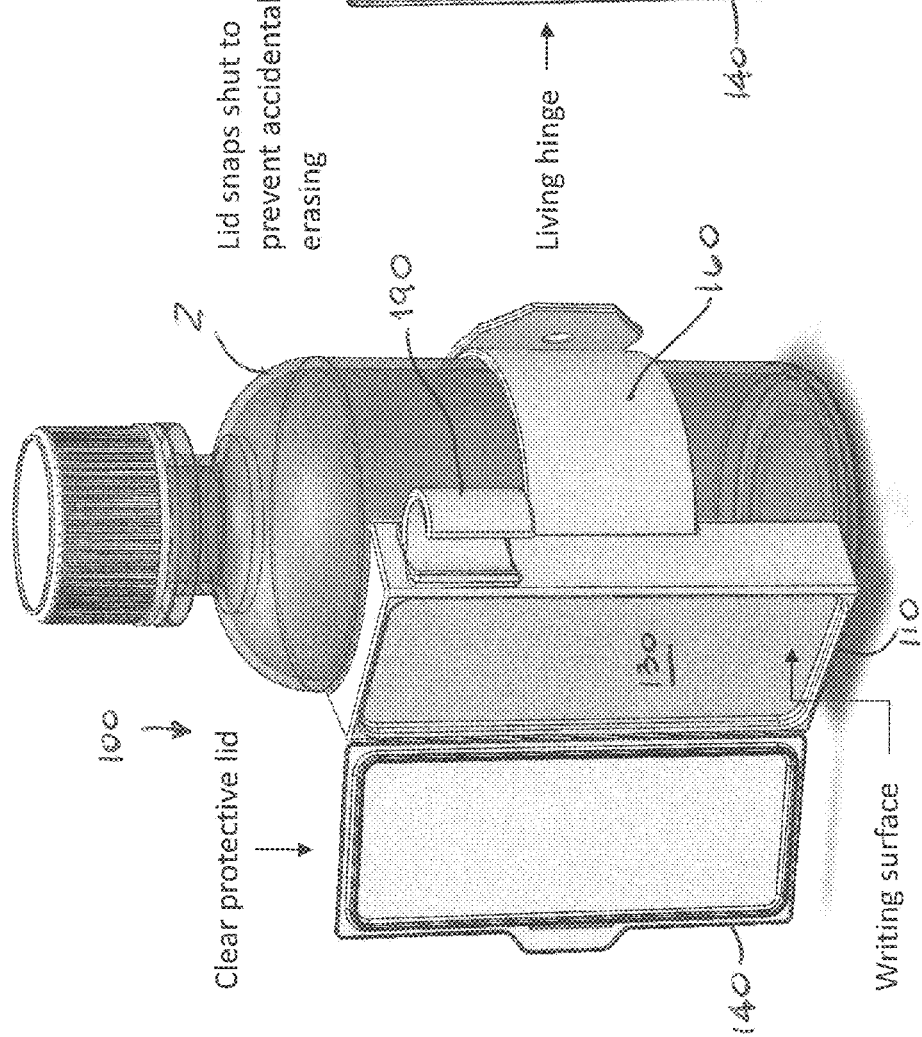

DEVICE FOR MANAGING MEDICINE CONSUMPTION AND/OR DISPENSING

CROSS-REFERENCE TO RELATED APPLICATIONS

This application is related to and claims priority from U.S. Provisional Patent Application Ser. No. 61/989,592 filed on May 7, 2014.

STATEMENT REGARDING FEDERALLY SPONSORED RESEARCH AND DEVELOPMENT

N/A

REFERENCE TO SEQUENCE LISTING, A TABLE, OR A COMPUTER PROGRAM LISTING COMPACT DISC APPENDIX

N/A

BACKGROUND OF THE INVENTION

1. Technical Field

The subject matter relates to consumption and/or dispensing of contents from a container. It further relates to a device including strap shaped member(s) configured for attachment to an exterior surface of the container, a write-on surface attached to the exterior surface(s) of the strap(s) and a holder for releaseably securing a writing implement.

2. Description of Related Art

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Typically, one of the recommendations to reduce medication errors and harm is to use the "five rights of medicine administration": the right patient, the right drug, the right dose, the right route, and the right time. However, the five rights should be accepted as a goal of the medication process not the "be all and end all" of medication safety. It is important to follow the rules of the 5 rights of patient medication administration to keep the patient safe and prevent harm. Medical professional errors may occur in the medical field, and utilizing the five rights points can help to avoid these errors.

It may be important for every medical professional to be knowledgeable about the medication being given to the patient. It may not be possible for every medical professional to know the drug facts on every drug. To be safe and competent, the medical professional should look up unfamiliar drug information before giving the medication to the patient. The patient has the right to information on the medication, the right to receive the correct medication, and the right to have a medical professional knowledgeable in the medication they are providing. Examples of the five rights of medicine administration may include:

Right Patient—Be sure you have the right patient before administering medication; Ask the patient to state their full name.

Right Medication—Check the bottle's label against the physician's authorization; Be sure they match.

Right Dose—Double check the amount of medication before administering; Be sure the amount to be given is clearly understood.

Right Time—Medication is to be given in substantial compliance with the physician's request; Within one half hour before or after the scheduled time.

Right Route—Designated medical professionals are authorized to administer oral medication only; Do not administer ear, eye, nose drops, topical medication, or injected medication.

Typically, medicine may include a special food or a chemical that makes someone better when they are ill. A lot of medicines are liquid and can be bought in a small bottle. Other medicines may come in pills or capsules. The doctor may tell the patient or caregiver how much medicine to take each day. Most medicines cannot be bought unless a doctor (or other authorized professional) has prescribed the medicine for the patient. Often, the doctor or pharmacist provide specific instructions for administering the medicine, including dosages, quantities, and warnings.

Typically, medicine containers are containers that contain medicine prescribed by doctors. Medicine containers come in different shapes, sizes, and colors. The most common is an orange pill bottle, opaque liquid bottle or a pill box.

Typically, dosage forms may be a mixture of active drug components and nondrug components. Depending on the method of administration they can come in several types. These are liquid dosage form, solid dosage form and semi-solid dosage forms. Various dosage forms may exist for a single particular drug, since different medical conditions can warrant different routes of administration. Additionally, a specific dosage form may be a requirement for certain kinds of drugs, as there may be issues with various factors like chemical stability or pharmacokinetics. The oral and intravenous doses of a medicine may also vary depending on the patient, the strength of the medication, and the severity of the illness.

Conventional medicine instruction labels used with medicine containers provide dosage information, however it is believed that such labels are generally not designed for recordation of dosage consumption, either past or future.

Although efforts have been made to track medicine consumption, further improvements have been found necessary, particularly to minimize interference with medicine information/instruction label commonly adhered to an exterior surface of the container as well as accommodate conventional medicine containers of various shapes and sizes

BRIEF DESCRIPTION OF THE DRAWINGS

The accompanying drawings are incorporated in and constitute part of the specification and illustrate various embodiments. In the drawings:

FIG. 1 illustrates a front 3-D view of one exemplary embodiment of a device for managing medicine consumption and/or dispensing;

FIG. 2 illustrates one environmental view of the device of FIG. 1;

FIG. 3 is another environmental view of FIG. 1;

FIG. 4 illustrates a 3-D view of another exemplary embodiment of a device for managing medicine consumption and/or dispensing;

FIG. 5 illustrates an exploded 3-D view of the device of FIG. 4, particularly illustrating attachment of the strap;

FIG. 6 illustrates a 3-D view of yet another exemplary embodiment of a device for managing medicine consumption and/or dispensing, particularly illustrating a different placement for the writing implement holder;

FIG. 7 illustrates a rear 3-D view of the device of FIG. 6;

FIG. 8 illustrates a 3-D view of yet a further exemplary embodiment a device for managing medicine consumption and/or dispensing, particularly illustrating a different placement for the writing implement holder;

FIG. 9 illustrates a rear 3-D view of the device of FIG. 8;

FIG. 18 illustrates a 3-D view of yet a further exemplary embodiment of a device for managing medicine consumption and/or dispensing, particularly illustrating the strap of a snap bracelet type;

FIG. 19 illustrates a front environmental 3-D view of another exemplary embodiment of a device for managing medicine consumption and/or dispensing in a combination with an over-the-counter or vitamin type bottle;

FIG. 20 illustrates a front elevation view of the device of FIG. 19;

FIG. 21 illustrates another front environmental 3-D view of a device for managing medicine consumption and/or dispensing in a combination with an over-the-counter or vitamin type bottle, particularly illustrating a lid in an open position;

FIG. 22 illustrates a top planar view of the device of FIG. 19;

FIG. 23 illustrates a rear elevation view of the device of FIG. 19;

FIG. 24 illustrates another environmental front 3-D view of a device for managing medicine consumption and/or dispensing in a combination with an over-the-counter or vitamin type bottle, particularly illustrating a lid in an open position;

FIG. 25 illustrates another environmental front 3-D view of a device for managing medicine consumption and/or dispensing in a combination with an over-the-counter or vitamin type bottle, particularly illustrating a lid in a closed position;

DETAILED DESCRIPTION OF EXEMPLARY EMBODIMENTS

Figure 10:
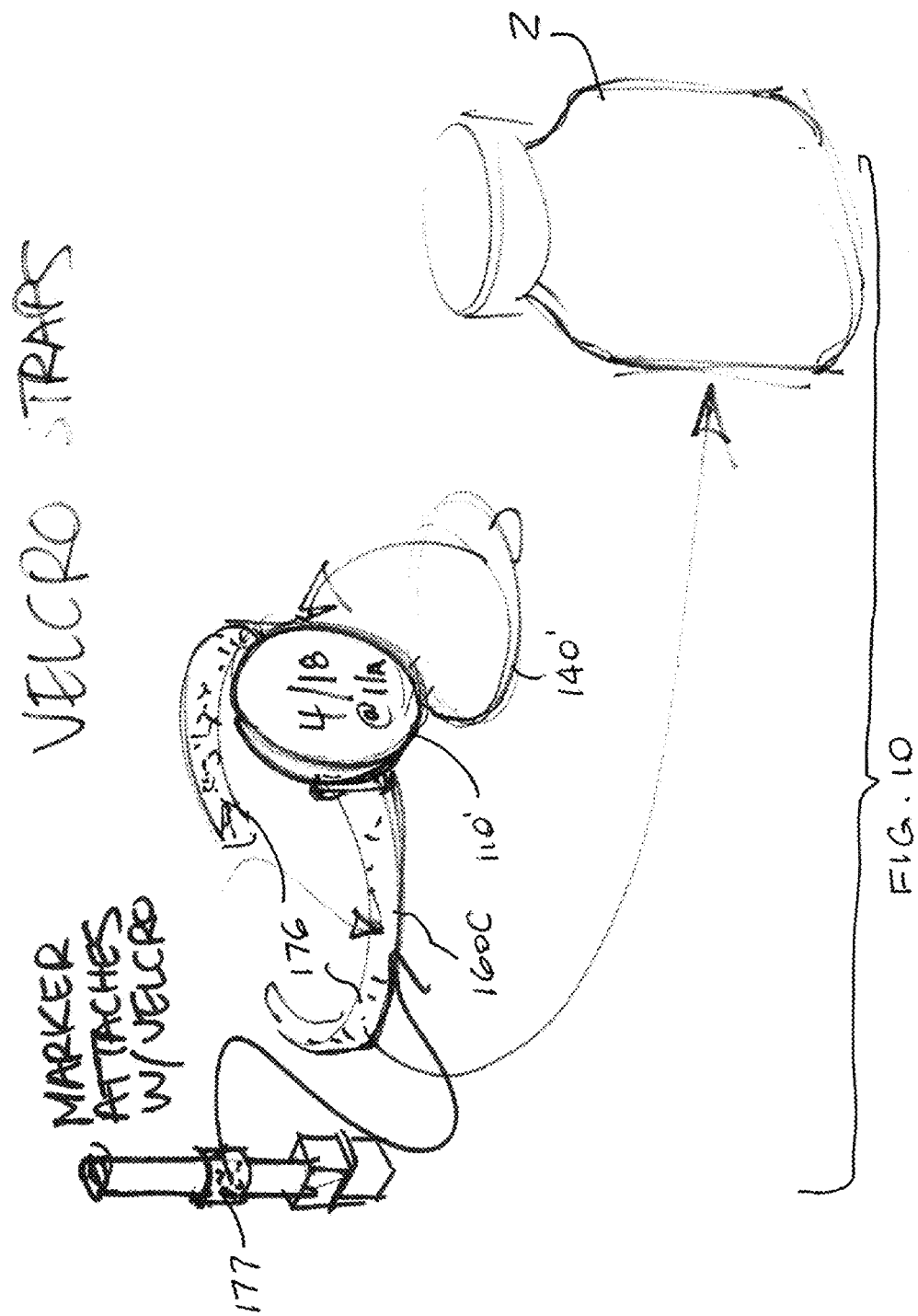
FIG. 10 illustrates a 3-D view of still another exemplary embodiment of a device for managing medicine consumption and/or dispensing, particularly illustrating the strap with hook and loop type fastening provisions.

Prior to proceeding to the more detailed description of the present invention, it should be noted that, for the sake of clarity and understanding, identical components which have identical functions have been identified with identical reference numerals throughout the several views illustrated in the drawing figures.

The following detailed description is merely exemplary in nature and is not intended to limit the described examples or the application and uses of the described examples. As used herein, the words "example", "exemplary" or "illustrative" means "serving as an example, instance, or illustration." Any implementation described herein as "example", "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," "exterior," "interior," and derivatives thereof shall relate to the invention as oriented in the Figures. Furthermore, there is no intention to be bound by any expressed or implied theory presented in the preceding technical field, background, or the following detailed description. It is also to be understood that the specific devices and processes illustrated in the attached drawings, and described in the following specification, are simply examples of the inventive concepts defined in the appended claims. Hence, specific dimensions and other physical characteristics relating to the examples disclosed herein are not to be considered as limiting, unless the claims expressly state otherwise.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a surface" includes reference to one or more of such surfaces.

The particular embodiments of the present disclosure generally provide a device or article of manufacture, for managing consumption and/or dispensing of contents from a container. The device includes a body configured for attachment to an exterior surface of the container, a write-on surface provided on the body and a holder for releaseably securing a writing implement. The write-on surface at least partially configured, sized and/or shaped to receive indicia thereon without binding and/or being absorbed thereby.

In particular embodiments, the container is a medicine holding container and the device for managing medicine consumption and/or dispensing accommodates prescription and non-prescription containers of various sizes.

In particular embodiments, the device or article of manufacture for managing medicine consumption and/or dispensing includes a transparent or translucent cover.

When concerned with medicine consumption and/or dispensing, the medicine may be any one of pills, tablets, capsules, liquids, patches, creams, ointments, eyedrops, eardrops, buccals, dissolving medicine, effervescents, aerosols, suspensions, emulsions, topicals, chewables, sublinguals, reconstitutables and injectables type related to prescriptions, over-the-counter medications, vitamins and/or supplements, and the like.

When further concerned with medicine consumption, the medicine container may include, without limitation, a tubular pill bottle, a liquid medicine bottle, a rectangular or square pill dispenser with one or more internal compartments, rectangular or square box package containing blister packs of medicines like Benadryl or cold medicine, and a cylinder shaped bottle.

Now in a particular reference to FIGS. 1-3, therein is illustrated one exemplary embodiment of a device or article of manufacture 100 for managing medicine consumption and/or dispensing. The device 100 comprises a body 110, which is shown as having a square shape. A rear surface 112 of the body 110 may at least partially have a concave shape to compliment a convex exterior surface 4 of a container 2, such as medicine bottle of FIGS. 2-3. The rear surface 112 may be planar of flat for use on containers 2 that have planar exterior surfaces. The rear surface 112 may be also provided as a combination of curved and planar surfaces.

The device 100 further comprises a member 128 provided on the body 110 and has a working or a write on-surface 130, defining the front surface of the body 110. The write on-surface 130 may be of a dry-erased type or any other type suitable for a repetitive erasable, markable and reusable use. Any type of the surface that can be written or drawn on utilizing a marking implement such as a pen, pencil, ink marker, dry-erase marker pen and the like and that can then be cleaned to remove the markings is contemplated herewithin without limitations. Such surface can be erased or cleaned using an eraser provided on the writing implement, a dry rag or sponge, a wet rag or sponge, a cleaning solvent or chemical, or other such cleaning paraphernalia.

The write-on surface 130 may be fabricated from a material that does not adhere or bind to indicia identifier 19, including, without limitation, a dry-erase surface, a melamine surface, porcelain, painted steel, and hardened laminate. The write-on surface 130 may be reused a multiplicity of times to reflect subsequent day, time and/or dosages of the medicine. The indicia identifier 19 is configured to adhere to any of the described write-on surfaces without binding and/or being absorbed by any of the write-on surfaces in this document.

In some examples, the indicia identifier 19 may include, without limitation, a dry-wipe marker ink, an erasable ink, eraser mate inks, and toulene and xylene based inks. In some examples, the indicia identifier 19 may be a nontoxic erasable ink that easily and quickly erases from the write-on exterior surface. In some examples, indicia identifier 19 can be simply represented by date and time values. In some examples, a portion of the indicia identifier 19 may be provided in a permanent, non-erasable, non-removable form, for example as a pre-printed indicia.

Any of the described write-on surfaces in this document may be provided, in alternative examples, as a stack of "Post-it"®. Notes wherein the indicia identifier 19 may be also provided of a permanent type.

The member 128 can be provided in a single or a multi-layer construction. The member 128 may be inserted, either partially or fully, into a cavity 126 in the body 110 during a molding process.

In one example, the member 128 with a dry-erase surface 130 may be of the type taught in U.S. Pat. No. 6,620,500, whose teachings are incorporated herein by reference thereto. Briefly, such dry erase member for receiving and releaseably retaining a marking composition comprises a substrate coated with a layer of dry erase material on a first face thereof. In specific embodiments, the dry erase coating includes a major amount of a fluorinated polymer or a cellulose acetate based polymer, together with a minor amount of a melamine resin. The dry erase member may include a layer of adhesive on a second face of the substrate to allow for temporary or permanent mounting of the dry erase member onto a surface. In specific embodiments, the dry erase member is flexible.

In another example, the member 128 with a dry-erase surface 130 may be of the type taught in application Ser. No. PCT/US2000/031750, whose teachings are incorporated herein by reference thereto. Briefly, dry erase laminate structure includes a rigid substrate, a thin plastic sheet adhered to the substrate, the plastic sheet having a substantially smooth, hard upper surface, and a nonporous 'UV' hardcoat film bonded to the upper surface of the plastic sheet, thereby providing a glass-like exposed writing surface. The substrate includes a tileboard panel, and optionally a thin steel sheet between the plastic sheet and tileboard to provide a magnetic laminate structure. A white colorant may be provided within the laminate structure to render the exposed surface opaque, and indicia, such as lines, grid, and the like, may be printed within the laminate structure that are visible through the exposed surface.

The member 128 may be also provided as a label with a sheet of no-top coated polyester film that prevents dry-erase marker ink from biting into the film and becoming indelible so that the ink can be removed easily from the sheet. The label can be either permanently or releaseably adhered to the body 128 with an adhesive 129 of FIG. 3.

In one example, the write-on surface 130 is exposed during use and is generally flush, except for manufacturing tolerances, with a peripheral edge 111 of the body 110. In another example, the peripheral edge 11 or a portion thereof may be raised above the write-on surface 130. In another example, an optional cover 140 may be also provided to selectively cover and uncover the write-on surface 130 so as to at least minimize and even prevent unintentional erasure of the indicia identifier 19. When cover 140 is provided, the cover 140 may have one edge 142 thereof being in a hinged connection with one edge 114 of the body 110. In one form, such hinged connection may be a living hinge. In another form, such hinged connection may be provided by a configuration including two pins and two sockets (not shown). The position of pins and sockets may be interchanged between the body 110 and the cover 140. In one example, the pins may be extending outwardly from the cover 140 and received within the sockets in the body 110. In another form, the hinged connection may be provided by complimentary/interlocking tabs on the body 110 and the cover 140.

In one example, the cover 140 may be sized to fit, in a snap or friction manner, within the peripheral edge 111 raised above the write-on surface 130 so as to retain the cover 140 in a closed position covering the indicia identifier 19. In another example, the cover 140 may be adapted with an optional flange 141 that overlaps the peripheral edge 111. In another example, the cover 140 may be further adapted with optional finger pull portions 143 and/or a snap tab 144. In another example, the cover 140 may be configured to overlap the peripheral surface 113 of the body 110. The cover 140 may be also configured to cover the write-on surface 130 in a non-frictional manner/contact with the body 110. In one example, the cover 140 may simply contact the peripheral edge 111 or may be even positioned at a slight gap/distance therewith.

Preferably, the inner surface of the cover 140 is spaced a distance from the write-on surface 130 although a contact between such two surfaces is also contemplated herewithin.

The body 110 may be at least temporarily attached and secured onto the exterior surface 4 of the container 2 with a strap 160. In one form of FIGS. 1-3, the strap 160 is provided as an endless member or band manufactured from a silicone material and being attached to the edges of the body 110 by way of an overmolding process. Such band is sufficiently elastic and resilient so as to grip the exterior surface 4 of the container 2 in a manner that prevent unintentional movement of the body 110 while allowing the user to manually reposition the body 110 on the exterior surface 4 so as not to obstruct the conventional instructional label (not shown). The band is further sufficiently elastic so that the user can install the device 100 onto the container 2 or remove the device 100 there from. It is also contemplated herewithin to provide a pair of straps 160, each positioned, in a spaced apart relationship, at a respective end of the body 110.

The device 100 may be adapted with an optional writing implement holder. In one example of FIGS. 1-3, the writing implement holder is an elastic/resilient clip 190 that is disposed on a surface of the strap 160 and is operable to releaseably secure a writing implement 80. The clip 190 may have a C-shaped cross-section 192 in a plane normal to a length thereof and size to envelop a portion of the exterior surface of the writing implement 80. It will be understood that the writing implement 80 can be selected from any conventional marking devices to complement the type of write-on surface 130. So, for example, when the write-on surface 130 is provided as a dry-erase surface, writing implement 80 will be of the type that will not allow permanent indicia 19 on the dry-erase surface 130.

The clip 190 of FIGS. 1-3 may be provided integrally with the strap 160 during a molding process or may be attached to the surface of the strap 160 with adhesives or a fastener, for example such a hook and loop fastener (not shown). The clip 190 may be positioned to orient the writing implement along the length or height of the container 2.

FIGS. 4-5 illustrate another exemplary embodiment of the device or article of manufacture 100, wherein the body 110 is an elongated member and includes a slot 122 formed through a width thereof and wherein a strap 160A is passed through the slot 122, aligning a length of the body 110 with the length or the height of the container 2 when the device 100 is attached thereto. The strap 160A may be either loosely housed within the slot 122 or sized to provide a friction fit after being housed therewithin. It is also contemplated that two slots 122, spaced apart along the length of the body 110, and two straps 160A may be provided. Furthermore, in this exemplary embodiment, the strap 160A is illustrated as an elongated member having a clasp 162 on one end so as to releaseably receive the opposite end of the strap 160A and provide for adjustments to accommodate containers 2 of various sizes. Furthermore, the writing implement holder 190' is illustrated as including a through aperture 194. Additionally, FIG. 4 illustrates that the cover 140 may be provided with a finger pull portion 142 and/or the snap tab 144 complementing at least partially raised peripheral edge 111.

FIGS. 6-7 illustrate another exemplary embodiment of the device or article of manufacture 100, wherein the body 110 is an elongated member and includes a recess 124 formed in the rear surface 112. The recess 124 sized and shaped to receive the strap 160B so that a surface of the strap 160B, along the width of the body 110, is exposed and may be flush with the rear surface 112, except for manufacturing tolerances. Such exemplary embodiment may be provided by overmolding the strap 160B with the body 110 to form 1-piece overmolded construction. The writing implement holder 190 is illustrated as being attached to an edge surface of the body 110, but may be attached to the strap 160B.

Furthermore, the strap 160B is illustrated as an elongated member having apertures 168 formed through a thickness thereof adjacent an end 164 of the strap 160B and a mushroom-shaped stud 170 disposed adjacent an opposite end 166 thereof. The end 166 may be also adapted with a pull portion 172 with an "easy-grip" projections 174 or any other suitable means. The apertures 168 provide for adjustments to accommodate containers 2 of various sizes.

FIGS. 8-9 illustrate another exemplary embodiment of the device or article of manufacture 100, wherein the body 110 is an elongated member and includes a recess 127 formed in the rear surface 112. The recess 127 sized and shaped to receive an enlarged portion 161 of the strap 160B so that a surface of the strap 160B, along the width of the body 110, is exposed and may be flush with the rear surface 112, except for manufacturing tolerances. Such exemplary embodiment may be provided by overmolding the strap 160B with the body 110 to form a 1-piece overmolded construction.

In a further reference to FIG. 8, the body 110 includes a pair of sides 116, 118 raised above the write-on surface 130, a pair of slots or channels 120 disposed on an inner surfaces of the sides 116, 118 and wherein the cover 140 is adapted for a reciprocal linear movement within the pair of slots or channels 120. The cover 140 may be manufactured from a translucent or a transparent material so as to allow unobstructed view of the indicia identifier 19 on the write-on surface 130. FIG. 8 further illustrates that the writing implement holder 190 is disposed on the exterior surface 146 of the cover 140 and further functions as a handle to move the cover 140 between an open and closed positions.

The strap 160B is illustrated as being an adjustable by way of apertures 168 and stud 172 but may be also provided with the above described clasp 162 or may be provided as the above described endless band 160 of FIGS. 1-3.

FIG. 10 illustrates another exemplary embodiment of the device or article of manufacture 100, wherein the body 110' and the optional cover 140' are provided as round shaped members. Furthermore, the strap 160C is provided as a pair of members adapted with a hook and loop type fastener 176. The writing implement 80 and the strap 160C are also illustrated as being adapted with another hook and loop type fastener 177.

Figure 11:
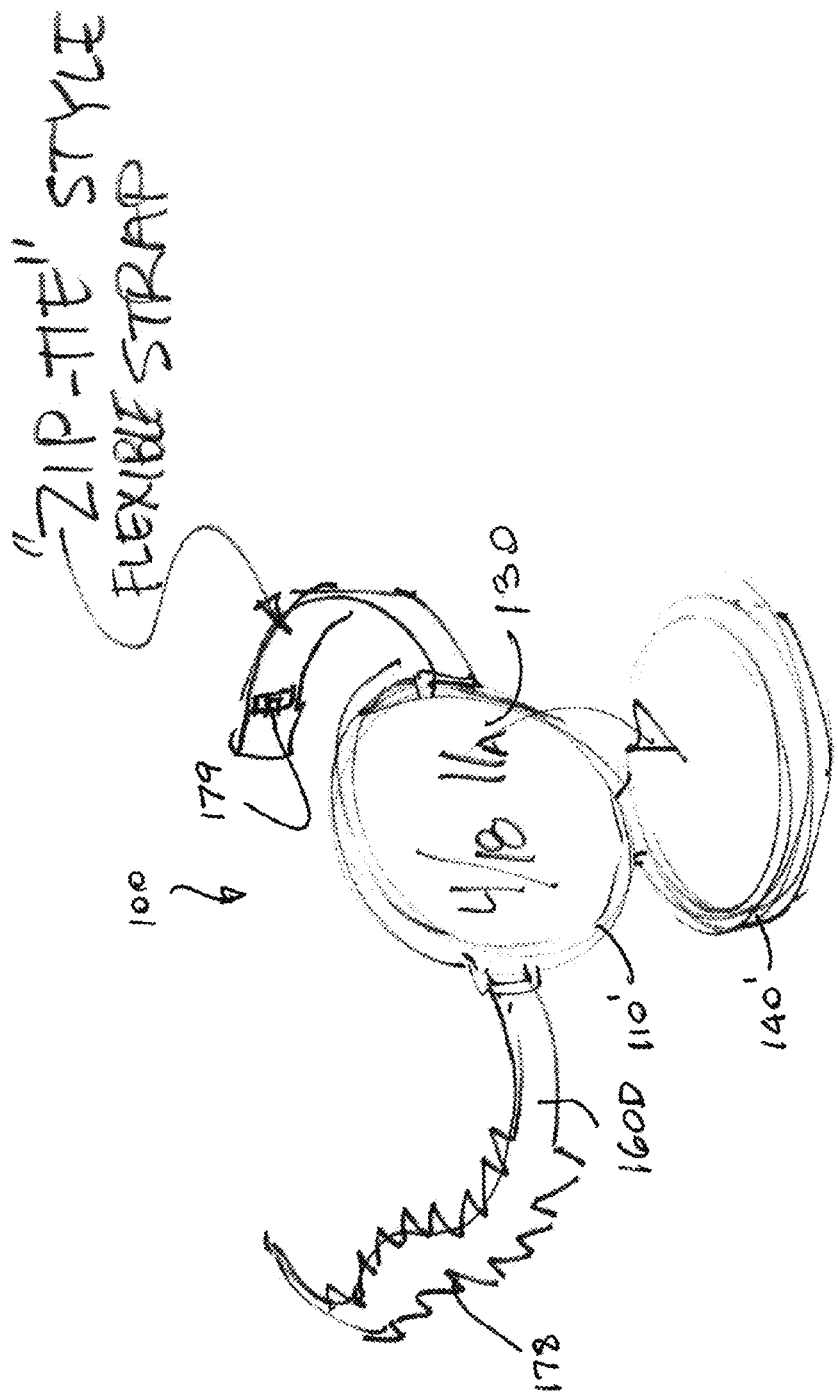
FIG. 11 illustrates a 3-D view of a further exemplary embodiment of a device for managing medicine consumption and/or dispensing, particularly illustrating the strap of a flexible zip-tie type.

FIG. 11 illustrates another exemplary embodiment of the device or article of manufacture 100, wherein the body 110' and the optional cover 140' are provided as round shaped members. Furthermore, the strap 160D is provided as a pair of members, with a toothed edge, "zip-tie" type fastener 178 on one of the pair of members and a slot 179 on the opposite one of the pair of members. The writing implement 80 and the strap 160D may be also adapted with the above described hook and loop type fastener 177.

Figure 12:
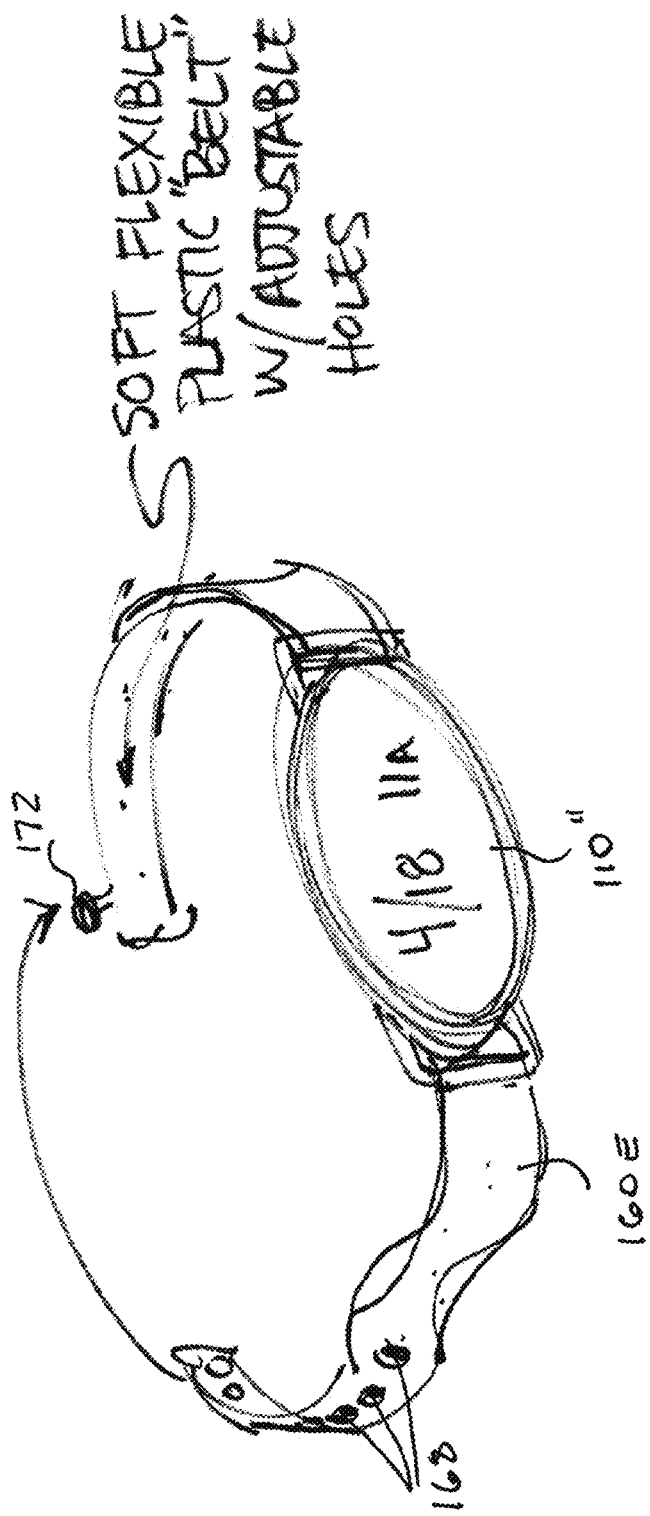
FIG. 12 illustrates a 3-D view of yet a further exemplary embodiment of a device for managing medicine consumption and/or dispensing, particularly illustrating the strap of an adjustable belt type.

FIG. 12 illustrates another exemplary embodiment of the device or article of manufacture 100, wherein the body 110" is provided in an oval shape and the strap 160E is illustrated as a pair of members adapted with the above described apertures 168 and stud 172 but may be also provided with the above described clasp 162 or may be provided as the above described endless band 160 of FIGS. 1-3.

Figure 13:
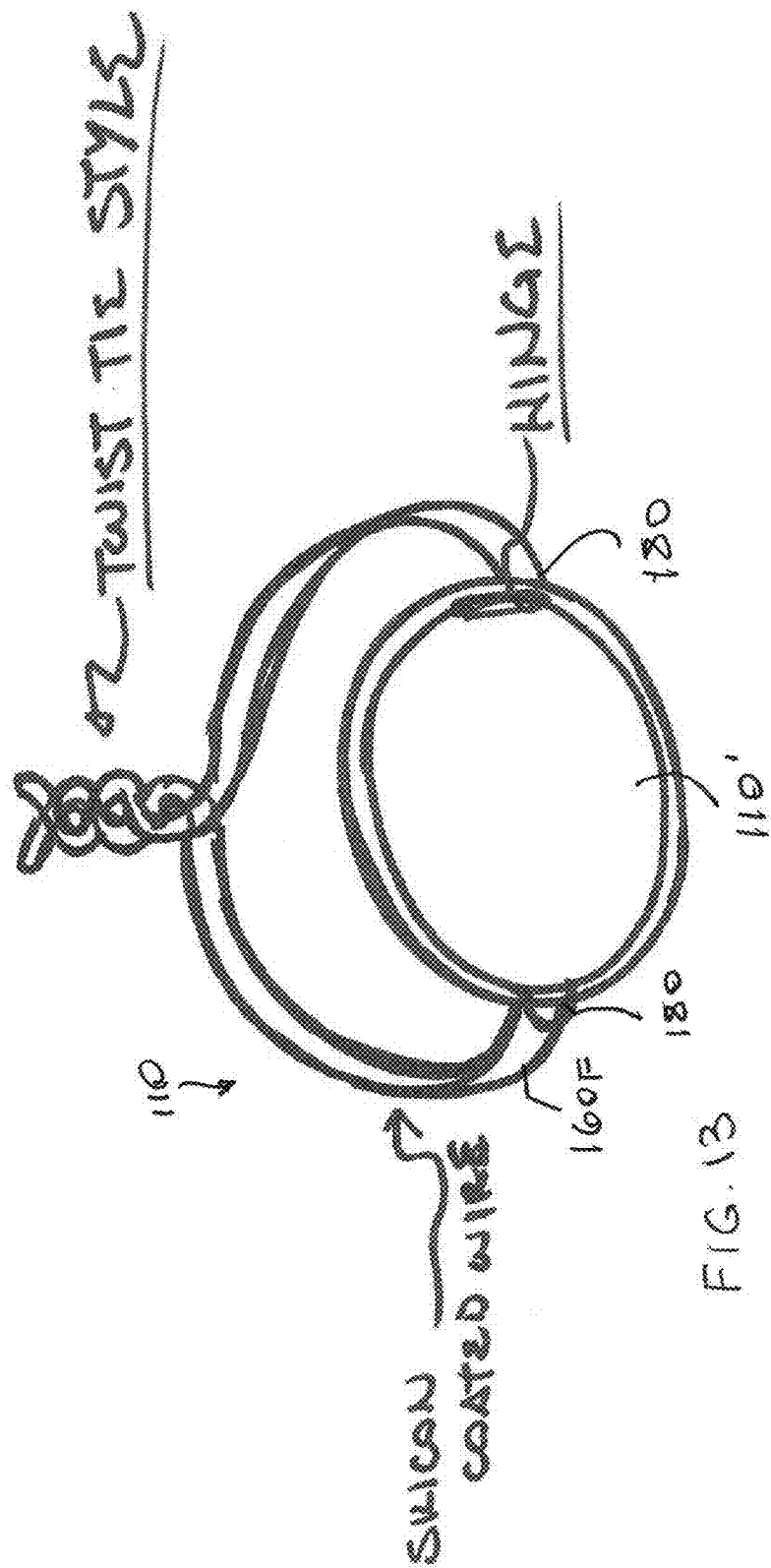
FIG. 13 illustrates a 3-D view of still a further exemplary embodiment of a device for managing medicine consumption and/or dispensing, particularly illustrating the strap of a twist tie type.

FIG. 13 illustrates another exemplary embodiment of the device or article of manufacture 100, wherein the strap 160F is provided by a pair of wires that can be manually twisted when the device 100 is attached to the exterior surface 4 of the container 2. The wires may be attached to the body 110' with hinges 180.

Figure 14:
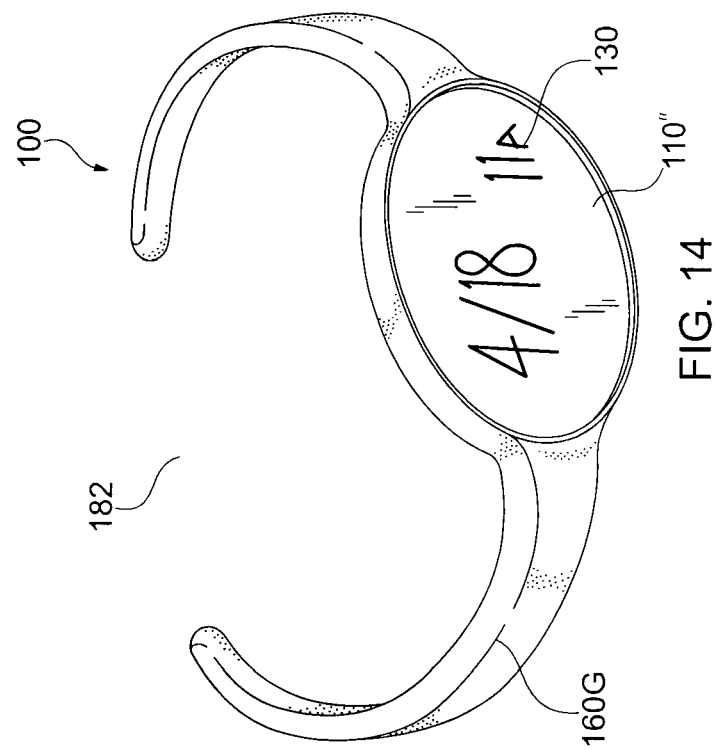
FIG. 14 illustrates a 3-D view of another exemplary embodiment of a device for managing medicine consumption and/or dispensing, particularly illustrating the strap in a flexible wire band form.

FIG. 14 illustrates another exemplary embodiment of the device or article of manufacture 100, wherein the strap 160G is provided by a pair of wires defining a flexible strap 160G with an opening 182 between free ends thereof.

Figure 15:
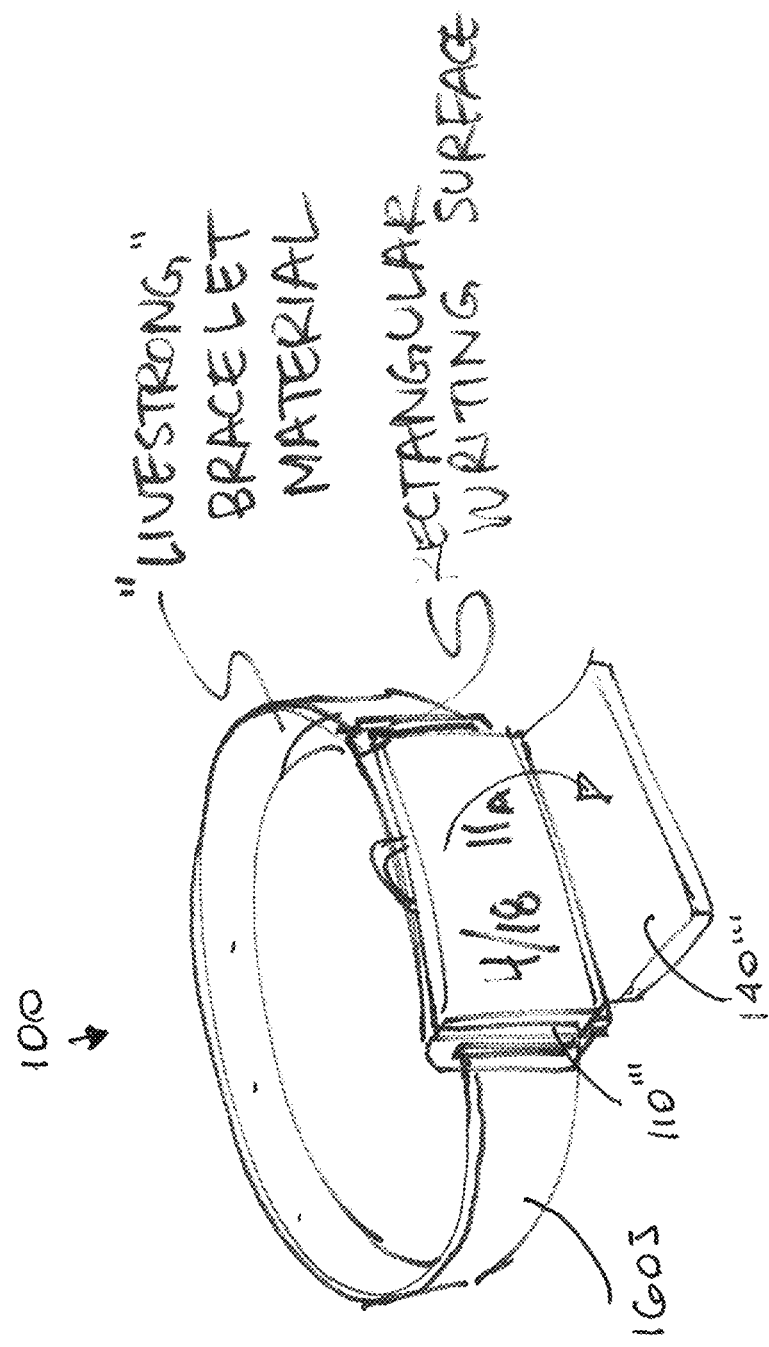
FIG. 15 illustrates a 3-D view of yet another form of a device for managing medicine consumption and/or dispensing, particularly illustrating the strap in a bracelet form.

FIG. 15 illustrates another exemplary embodiment of the device or article of manufacture 100, wherein the strap 160J is provided in a bracelet form and wherein the body 110'" and the optional cover 140'" are provided as rectangular shaped members.

Figure 16:
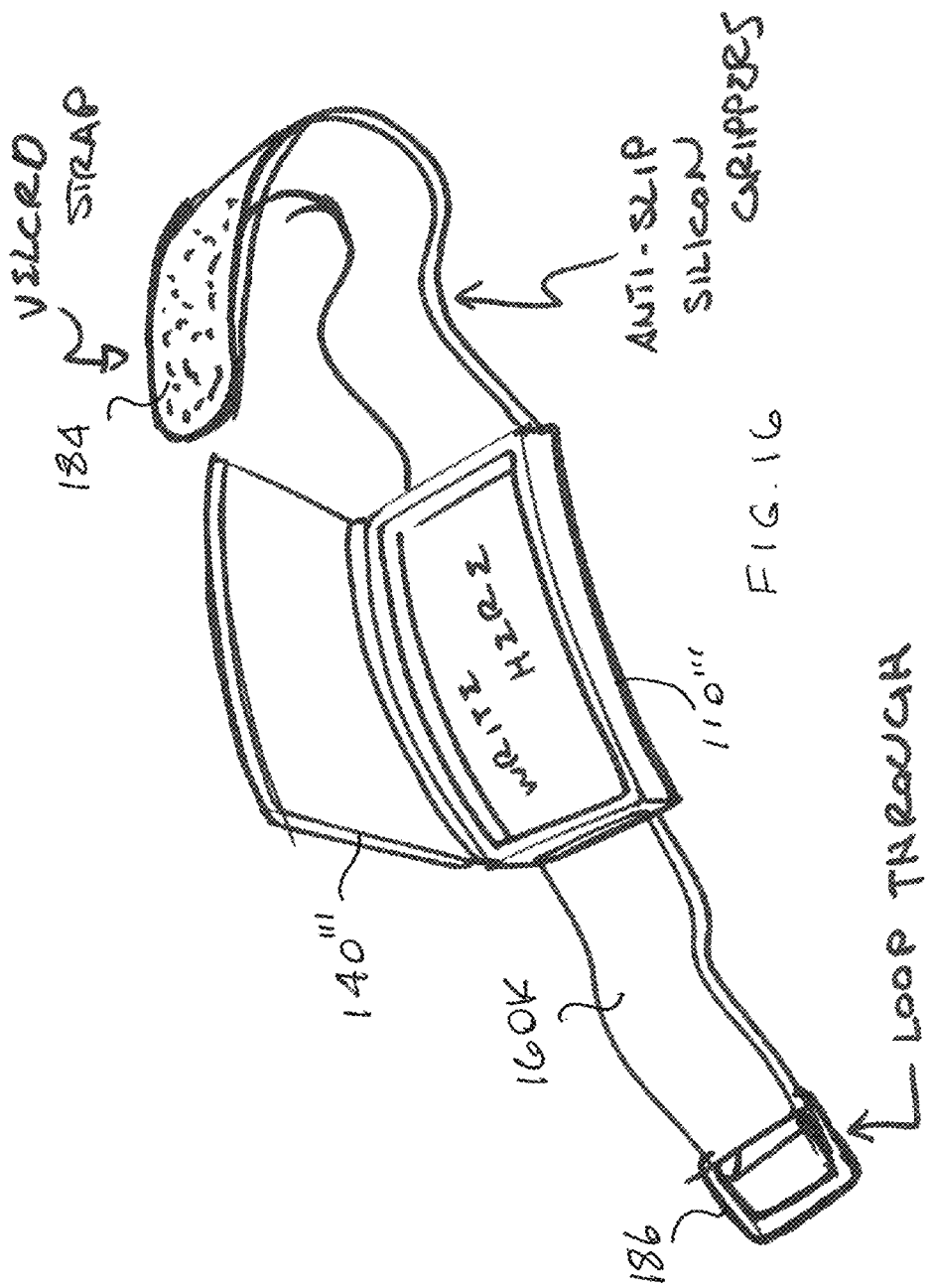
FIG. 16 illustrates a 3-D view of still another exemplary embodiment of a device for managing medicine consumption and/or dispensing, particularly illustrating the strap with hook and loop type fastening provisions on one end and a through loop on an opposite end.

FIG. 16 illustrates another exemplary embodiment of the device or article of manufacture 100, wherein the strap 160K is provided with hook and loop type fastener 184 on one end and a through loop 186 on an opposite end and wherein the body 110'" and the optional cover 140'" are provided as rectangular shaped members.

Figure 17:
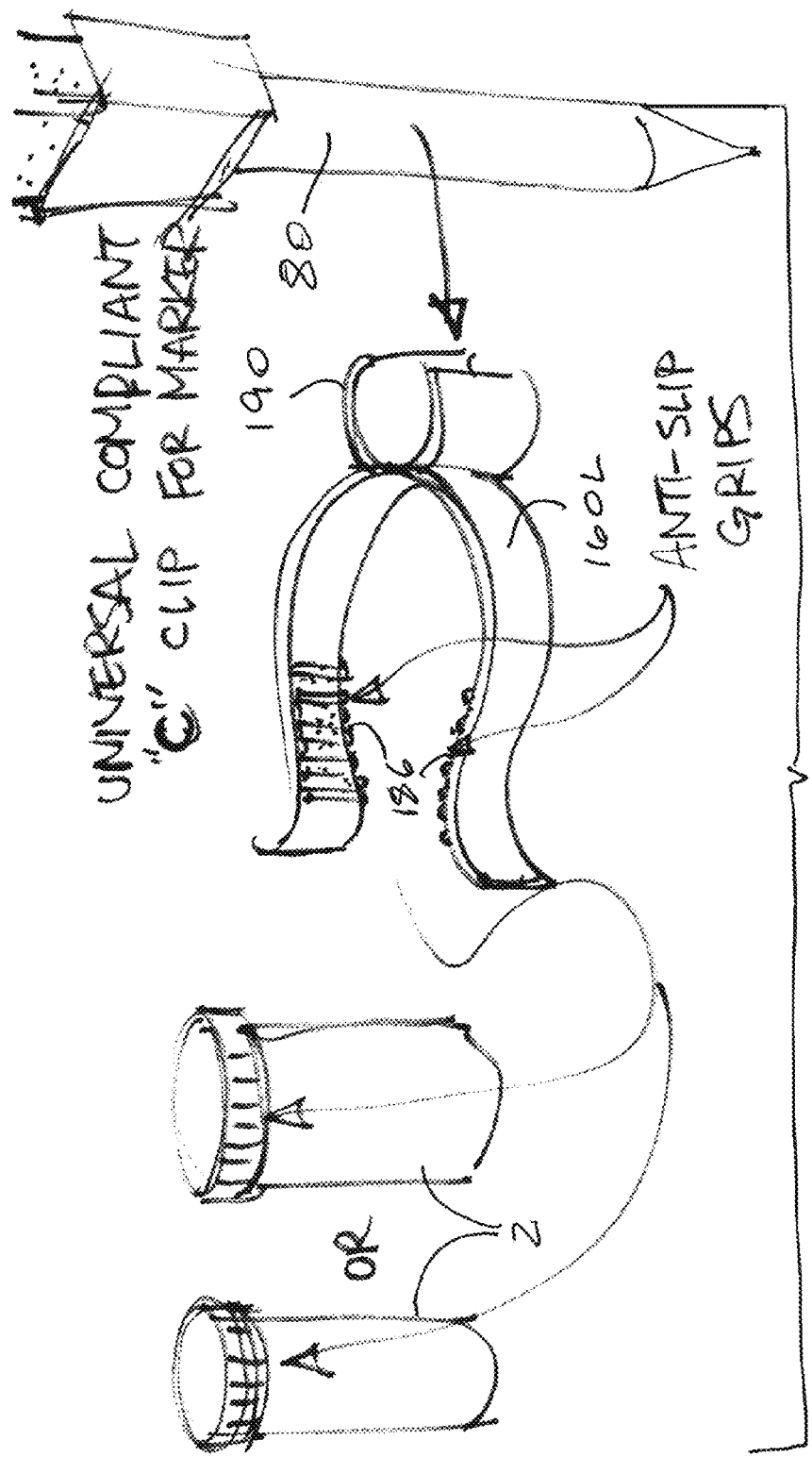
FIG. 17 illustrates a 3-D view of a further exemplary embodiment of a device for managing medicine consumption and/or dispensing, particularly illustrating the strap with an anti slip grips on an interior surface.
Figure 30:
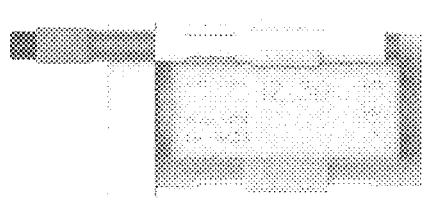
FIG. 30 illustrates a front elevation view of the device of FIG. 26.
Figure 29:
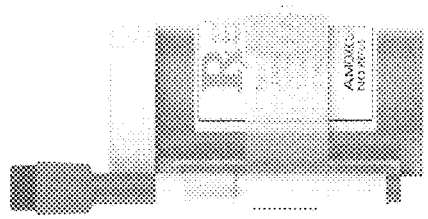
FIG. 29 illustrates a side elevation view of the device of FIG. 26.
Figure 28:
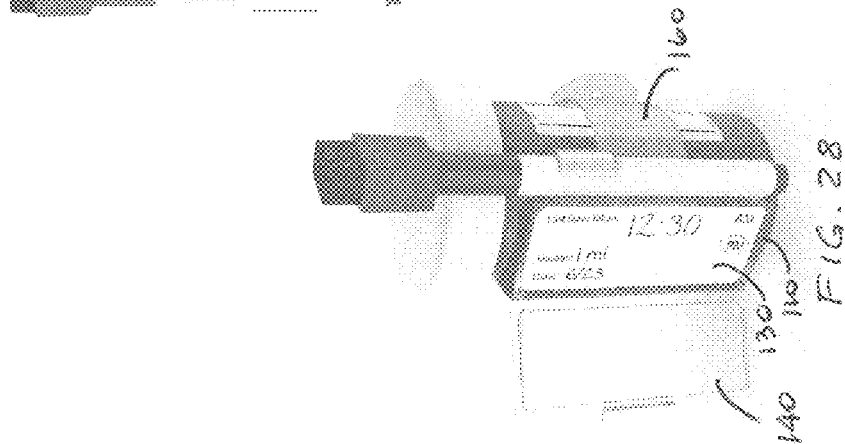
FIG. 28 illustrates another front environmental 3-D view of the device of FIG. 26, particularly illustrating a lid in an open position.
Figure 27:
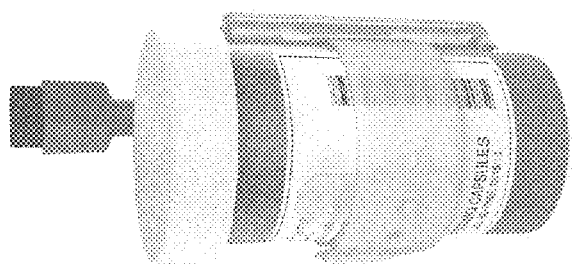
FIG. 27 illustrates a rear environmental front 3-D view of the device of FIG. 26.
Figure 26:
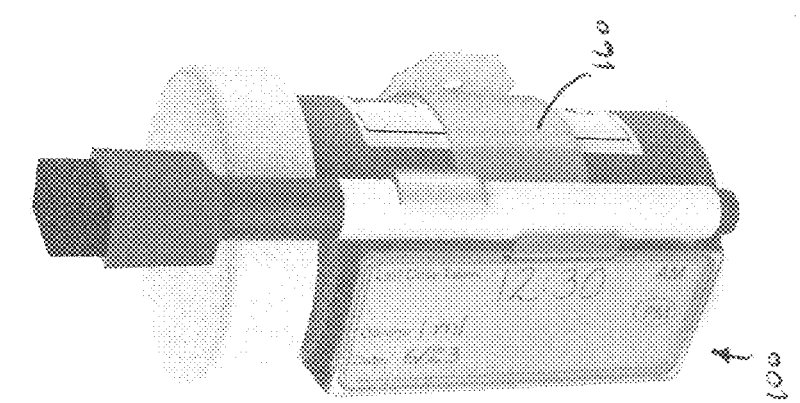
FIG. 26 illustrates a front environmental 3-D view of a device for managing medicine consumption and/or dispensing in a combination with a prescription type bottle.

FIG. 17 illustrates another exemplary embodiment of the strap 160L with an anti-slip grips 186, illustrates as raised elongated ridges, on an interior surface of the strap 160L.

FIG. 18 illustrates another exemplary embodiment of the device or article of manufacture 100, wherein the strap 160M is provided as a snap bracelet type movable between a flat open position and a closed position. The ends of the strap 160M may be manufactured from a silicone material or the ends of the strap 160M, manufactured from other materials, may be coated with silicon material.

Additionally, FIGS. 19-25 illustrate the above described device 100 of FIGS. 1-3 in a combination with the container 2 that may be used for non-prescription medications or supplements. FIGS. 19-25 also illustrate (when presented without reference numerals and further in a conjunction with the relevant Brief Description of the Drawings) an ornamental design for an assembly comprising a medicine container, a device with a write-on surface, hinged cover, a writing implement holder and the writing implement. Each of the cover 140, writing implement holder 190 and the writing implement 80 may be provided as an optional member.

FIGS. 26-30 illustrate the above described device 100 of FIGS. 1-3 in a combination a prescription type bottle. FIGS. 26-30 also illustrate (when presented without reference numerals and further in a conjunction with the relevant Brief Description of the Drawings) an ornamental design for an assembly comprising a medicine container, a device with a write-on surface, a cover, a writing implement holder and the writing implement. Each of the cover 140, writing implement holder 190 and the writing implement 80 may be provided as an optional member.

In operation, the user tasked with taking or giving medicine or a caregiver tasked to assist with taking or administering medicine can easily mark/write, with the writing implement 80, the date and/or time of the next dose immediately upon current dose being disposed of. Or the date and/or time of the last dose consumption can be recorded immediately after the medicine has been consumed. Dosage consumption can also be recorded. All or partial previously recorded information can be reviewed and erased prior to taking or administering medicine or may be erased after taking or administering medicine.

When the user obtains a new container 2, the user simply attaches any one of the described exemplary embodiments by way of the provided strap.

Figure 31:
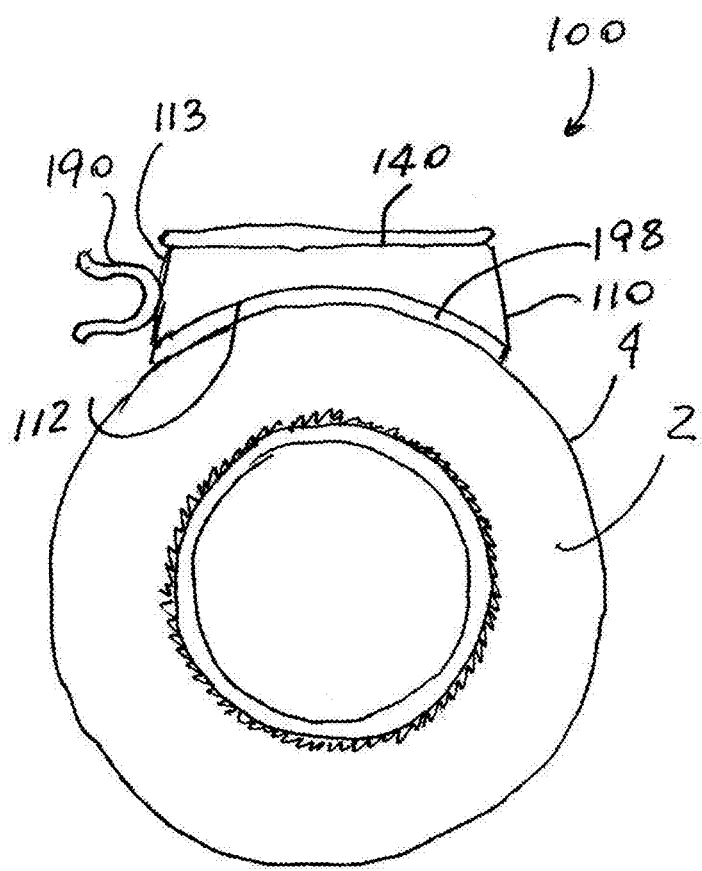
FIG. 31 illustrates a side view of another exemplary embodiment of a device for managing medicine consumption and/or dispensing.

It is also contemplated, in a reference to FIG. 31, that the device or article of manufacture 100, can be provided without any of the above described straps by including an adhesive member 198 on the rear surface 112 of the body 110 that can be of any of the above described exemplary embodiments. Such adhesive member 198 may be a releaseable type allowing repetitive use of the device 100. Adhesive member 198 may be also provided as a part of a loop and hook fastener or the like releaseable fastener. Cover 140 and writing implement holder 190 are also illustrated in FIG. 31, but may be provided as one or both optional member(s).

In some of the various exemplary embodiments, the cover 140, 140' and/or any one of the straps 160-160E and 160J-L may be manufactured from either a transparent (light transmissive, light permeable, clear, translucent), a non-transparent (light-resistant, non-translucent, opaque) material or a combination thereof.

The transparent material may be polypropylene and tinted, for example such as amber, to conform with the light-permeation/transmission standards specified in the United States Pharmacopeia (USP) Standard 24 <661> while sufficiently transmissive in the remainder of the visible spectrum. Polypropylene tends to be somewhat cloudy, and thus may need to undergo a standard clarification process in order to become sufficiently transmissive so as to allow viewing therethrough. Such material may be also high-density or low-density polyethylene.

The method of managing consumption and/or dispensing of contents in a container, for example such as medicine, includes the steps of providing a device or an article of manufacture that includes a body with a write-on surface, the step of attaching the body onto an exterior surface of the container so that the write-on surface is readily available for use, the step of recording, with a writing implement, information being at least one of a date, time, consumption and/or usage dosage or quantity, and/or description of contents in the container at every dispersion or dispensing occurrence of such contents and the step of erasing any previously recorded information.

The step of attaching the device or the article of manufacture onto the exterior surface of the container may include the step of attaching strap(s) to the body and caging the exterior surface of the container within the strap(s) or the step of attaching the body with an adhesive. The step of attaching strap(s) to the body may include any one of the step of forming openings, slots, recesses in the body, the step of attaching the strap in either removable or permanent manner, the step of providing the strap as a pair of member/portions, each attached, at one end thereof, to the body.

The method may also include an optional step of attaching a writing implement holder either to the body or to the strap or providing the writing implement as a separate member.

The method may also include an optional step of attaching a cover to the body so as to selectively cover (protect) and uncover (expose) the write-on surface. The step of attaching the cover may include the step of pivoting the cover by way of any one of a living hinge arrangement, pins and sockets, interlocking tabs on both the cover and the body, a shaft-like member on the cover caged by one or two holders on the body, where the holders may be shaped similarly to the above described writing implement holder 190. The step of attaching the cover may include the step of moving the cover in a linear manner by way of slots or channels in the raised sides of the body.

When the container includes a curved exterior surface, the method includes the step of adapting the body with a complimentary curved surface.

When the subject matter is related to medicine containers having an instructional label on the exterior surface thereof, the method includes the step of positioning the body and the strap(s) and/or providing the body and/or the straps in a transparent material so as to at least minimize the obstruction of the instructional label.

The above described steps also provide a method for tracking use or consumption of contents in a container.

Some of the various exemplary embodiments relate to tracking information. In these embodiments, user can track at least one of date, time, consumption and/or usage dosage or quantity, and description of contents in a container. Use can track at least one of date, time and dosage of consumed medicine or the date, time and dosage of to be consumed medicine or any combination thereof. The user may also track the name of the medicine content itself. The related information may be recorded in an erasable or permanent manner by any marking or writing implement on a write-on surface provided positioned about an exterior surface of the container.

In one exemplary embodiment, a device for managing medicine consumption and/or and dispensing comprises a body, a write on-surface provided on the body, a cover movable to selectively cover and uncover the write-on surface, a strap attached to the body, and a clip disposed on a surface of the strap, on the body or on the cover, the clip operable to releaseably secure a writing implement.

In another exemplary embodiment, a device for managing medicine consumption and/or dispensing comprises a body having a curved rear surface, a write on-surface provided on the front surface of the body, a cover movable to selectively cover and uncover the write-on surface, a writing implement holder disposed on the body and operable to releaseably secure a writing implement and an adhesive disposed on the curved rear surface of the body so as to at least temporarily or releaseably attach the body to the exterior surface of the container.

In one exemplary embodiment, the strap is light-transmissive, translucent or transparent to view the consumption and/or dispensing instructions that are generally provided on an instructional label.

In one exemplary embodiment, two straps are spaced apart with each other, each positioned at a respective end of the body, so as to at least minimize obstruction of consumption and/or dispensing instructions that are generally provided on an instructional label.

In one exemplary embodiment, the strap is provided as an adjustable band to accommodate prescription or non-prescription containers or bottles of different sizes.

In one exemplary embodiment, the device for managing medicine consumption and/or dispensing aids in prevention of overdosing by recording the "Last Dose Taken (Given)".

In one exemplary embodiment, the strap is manufactured from an anti-slip material to enhance stability during a writing effort.

In one exemplary embodiment, the device for managing medicine consumption and/or dispensing aids people in successful transitioning from a hospital or pharmacy environment to a home care environment by "mimicking" the way medications are given. In an effort to reduce hospital re-admissions and reduce healthcare costs, the device functions as a teaching tool in medicine dispensing and consumption.

In one exemplary embodiment, "Last Dose Given (Taken)" is the time that may be recorded immediately after medication consumption. One or more of the words "Last Dose Taken", "Next Dose Due", "am", "pm" and "date" may be pre-printed on the write-on surface guiding the user to avoid any confusion concerning the date/time that should be recorded. For uses other than medicine, the indicium identifier "Last Dose Taken" may be replaced, for example, with indicium identifier "Last quantity/amount used". Equally as well, the indicium identifier "Next Dose Due" may be replaced, for example, with indicium identifier "Next quantity/amount due".

The chosen exemplary embodiments of the claimed invention have been described and illustrated for practical purposes so as to enable any person skilled in the art to which it pertains to make and use the same. It is therefore intended that all matters in the foregoing description and shown in the accompanying drawings be interpreted as illustrative and not in a limiting sense. It will be understood that variations, modifications, equivalents and substitutions for components of the specifically described exemplary embodiments of the invention may be made by those skilled in the art without departing from the spirit and scope of the invention as set forth in the appended claims. For example, although the various exemplary embodiments have been illustrated and described in combination with a medicine container, it will be apparent to those skilled in the relevant art that the various exemplary embodiments may be applied to other containers used for storage of dry goods, for example such as cereal, rice, grains, sugar, candies and the like or liquids, for example such as dressings, oils, soups and the like. By way of one example only, the system can be used to mark an expiration date of cookies placed into a conventional "cookie jar". By way of another example only, the container can be used for storing a baking mix of ingredients with the marking surface being sufficiently sized and shaped not only to be used for indicating the name of the product and storage time frame but also for writing a recipe that uses the mix. Once the mix contents have been consumed, the container can be employed for storing a different product requiring different information to be written on a marking surface.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

Any element in a claim that does not explicitly state "means for" performing a specified function, or "step for" performing a specified function, is not to be interpreted as a "means" or "step" clause as specified in 35 U.S.C. §112 ¶6. In particular, any use of "step of" in the claims is not intended to invoke the provision of 35 U.S.C. §112, ¶6.

Furthermore, the Abstract is not intended to be limiting as to the scope of the claimed invention and is for the purpose of quickly determining the nature of the claimed invention.

What is claimed is:

1. An article of manufacture, comprising:
   (a) a body comprising a pair of sides and a pair of slots or channels, each of said pair of slots or channels is disposed on an interior surface of one side from said pair of sides;
   (b) a write-on surface provided on said body below said pair of slots or channels so that said pair of sides being raised above said write-on surface, said write-on surface comprising any one of a dry-erase surface, a melamine surface, a porcelain, a painted steel, and a hardened laminate;
   (c) a cover being mounted for a linear movement within said pair of slots or channels to selectively cover and uncover said write-on surface;
   (d) a strap attached to said body; and
   (e) a writing implement holder disposed on a surface of said cover, said writing implement holder operable to releaseably secure a writing implement, said writing implement holder defines a handle that can be manually grasped by a user of said article of manufacture to move said cover.

2. The article of manufacture of claim 1, wherein a surface of said body disposed opposite said write-on surface has a concave shape.

3. The article of manufacture of claim 1, wherein said cover is manufactured from a non-transparent and/or a transparent material.

4. The article of manufacture of claim 1, wherein said strap is provided as an endless member and being manufactured from an elastic material.

5. The article of manufacture of claim 1, wherein said body includes a slot through a thickness thereof and wherein said strap is passed through said slot.

6. The article of manufacture of claim 1, wherein said strap is integral to said body.

7. The article of manufacture of claim 1, wherein said strap defines an elongated member and has a clasp on one end thereof.

8. The article of manufacture of claim 1, wherein said strap defines an elongated member and has apertures formed through a thickness thereof adjacent one end of the strap and a mushroom-shaped stud disposed adjacent an opposite end thereof.

9. The article of manufacture of claim 1, wherein at least one of said strap and said cover is manufactured from a transparent or a non-transparent material.

10. An article of manufacture, comprising:
    (a) a body comprising:
       a pair of sides;
       a pair of slots or channels, each of said pair of slots or channels is disposed in an interior surface of one side from said pair of sides,
       a curved bottom surface, and
       a recess in said curved bottom surface;
    (b) a write-on planar top surface, said write on planar top surface comprising any one of a dry-erase surface, a melamine surface, a porcelain, a painted steel, and a hardened laminate;
    (c) a cover being mounted for a linear movement within said pair of slots or channels to selectively cover and uncover said write-on surface;
    (d) a strap attached to said body and comprising a portion thereof being disposed within said recess; and
    (e) a writing implement holder disposed on a surface of said cover, said writing implement holder operable to releaseably secure a writing implement, said writing implement holder defines a handle that can be manually grasped by a user of said article of manufacture to move said cover.

11. The article of manufacture of claim 10, further comprising a writing implement.

12. An article of manufacture, comprising:
    (a) a body comprising a pair of sides and a pair of slots or channels, each of said pair of slots or channels is disposed on an interior surface of one side from said pair of sides, said body further comprising a curved bottom surface;
    (b) a write-on planar top surface, said write-on planar top surface comprising any one of a dry-erase surface, a melamine surface, a porcelain, a painted steel, and a hardened laminate;
    (c) a cover being mounted for a linear movement within said pair of slots or channels to selectively cover and uncover said write-on surface;
    (d) a strap attached to said body;
    (e) a writing implement; and
    (f) a writing implement holder disposed on an exterior surface of said cover, said writing implement holder operable to releaseably secure the writing implement, said writing implement holder defines a handle that can be manually grasped by a user of said article of manufacture to move said cover.

13. The article of manufacture of claim 12, wherein said body comprises a recess in said curved bottom surface and wherein a portion of said strap is disposed within said recess so that a surface portion of said strap is flush with said bottom curved surface.

* * * * *